United States Patent Office 3,222,404
Patented Dec. 7, 1965

3,222,404
SULFUR-CONTAINING PHENOLS
Marinus J. van den Brink and Jan van Schooten, both of Amsterdam, Netherlands, assignors to Shell Oil Company, New York, N.Y., a corporation of Delaware
No Drawing. Filed Dec. 14, 1961, Ser. No. 159,455
Claims priority, application Netherlands, Mar. 30, 1961, 263,102
10 Claims. (Cl. 260—609)

This invention relates to the preparation of sulfur-containing phenolic compounds. More particularly, the invention relates to sulfur-containing phenolic compounds prepared by the reaction of phenols with sulfur compounds.

Specifically, the invention provides a process for the preparation of sulfur-containing phenolic compounds which comprises reacting a compound of the general type Q—SH wherein Q is selected from the group consisting of hydrogen and organic radicals with a phenol in which one or more hydrogen atoms of the aromatic nucleus is substituted by the group

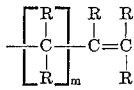

wherein R is selected from the group consisting of hydrogen and alkyl groups and $m$ is an integer. The invention further provides novel and useful sulfur-containing phenolic compounds in which one or more hydrogen atoms of the aromatic nucleus are substituted by the group

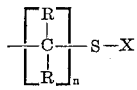

wherein X is an organic radical, R is hydrogen and/or alkyl radicals and $n$ is an integer equal to or greater than 2.

It is known that certain sulfur-containing phenolic compounds such as thiophenols and thiobisphenols are suitable as antiozonants and antioxidants for organic materials, particularly for natural and synthetic rubber and for oils, gasolines, fats and the like.

Polymers of ethylenically unsaturated hydrocarbons generally exhibit degradation when processed or stored with resulting deterioration of properties. In order to inhibit and suppress this undesirable degradation and consequent changes in properties, certain compounds called stabilizers are added thereto, such as those noted above. Thus, it is known that certain thiobisphenols in which the sulfur atom is attached directly to the phenyl nuclei, and in the phenyl nuclei generally at least one hydrocarbon group has been substituted at the ortho-position relative to the hydroxyl group are effective stabilizers for ethylenically unsaturated hydrocarbons.

It has now been found that certain new sulfur-containing phenolic compounds prepared by a novel process are superior antioxidants for olefinically unsaturated hydrocarbons. These new and useful sulfur-containing phenols, it has been found, are especially suitable for the thermal stabilization of polyolefins and particularly those polyolefins which have been prepared at pressures below 100 atmospheres and using the so-called Ziegler catalysts.

It is therefore an object of the invention to provide a process for preparing novel sulfur-containing phenols. It is an other object of the invention to provide a process for preparing sulfur-containing phenols having improved antioxidant properties, particularly when used with polyolefins prepared with Ziegler catalysts. Other objects and advantages of the invention will become apparent to one skilled in the art from the accompanying disclosure and discussion.

It has now been discovered that these and other objects may be accomplished by the process for the preparation of sulfur-containing phenolic compounds which comprises reacting a compound of the general type Q—SH wherein Q is hydrogen or an organic radical, wtih a phenol in which one or more hydrogen atoms of the aromatic nucleus are substituted by the group

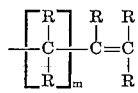

wherein R is selected from the group consisting of hydrogen and alkyl-groups and $m$ is an integer.

It has been found that these novel products possess excellent antioxidant properties and are therefore suited to improve the stability of numerous products which are attacked by oxygen, such as hydrocarbon oils, e.g., lubricating oils, synthetic resins, rubbers and the like. These said products are particularly suited for addition to polymers and copolymers of olefinically unsaturated hydrocarbons such as ethylene, propylene and the butenes, and more particularly to those polymers and copolymers which have been obtained by means of metal catalysts, e.g., Ziegler catalysts.

The substituted phenol used as the starting material, is derived from benzene, naphthalene, phenanthrene or from other aromatic systems. Also included in these systems are heterocyclic nuclei of an aromatic character, such as pyridine, quinoline, acridine, pyrimidine, furan, thiophene, benzothiazole, etc.

According to the above general definition the phenol in question must contain at least alkenic substituent. In addition, the phenol should preferably also be substituted in the nucleus by one or more hydrocarbon radicals (hereinafter called Y). Both the alkenic substituents and the hydrocarbon radicals Y can be either the same or different from each other. Besides or instead of the hydrocarbon radicals Y still other substituents, e.g., a second hydroxyl group and/or an alkoxy radical, may be bound to the aromatic nucleus of the phenol, if desired. Examples of the last-mentioned cases are derivatives of pyrocatechol and of p-tert-butoxyphenol. The maximum possible number of substituents is, of course, dependent on the number of positions available in the aromatic nucleus in question. In most cases, however, it is disadvantageous to start from very highly substituted compounds.

Preferably, phenols are used which are substituted at the ortho-position(s) and/or the para-position with respect to the hydroxyl group. Although according to the invention substituted phenols, naphthols, anthranols and other hydroxy aromatic compounds may be applied, generally preference is given to derivatives of phenol. In these cases the number of substituents Y, if present, can be 4 at most, since the aromatic nucleus must contain at least one alkenic substituent.

The alkenic substituent(s) contain(s) at least 2 and generally not more than 12 carbom atoms. These may either form a single straight chain or be branched in one or more places. In the latter case, an alkyl group R preferably contains not more than 3 carbon atoms. Particularly favorable results are obtained when the radicals R represent hydrogen atoms and/or methyl groups. The alkylene groups —C(RR)—, which according to the general formula may be present, and which as a rule are present in a number not greater than 10, may be the same or different from each other. Compounds wherein $m$ is equal to zero or not greater than 3 are very useful. Examples are: vinyl, isopropenyl and 3-butenyl derivatives of phenols. Especially those compounds where $m$ is equal to 1, such as allyl, methallyl and crotyl derivatives have proved to be pre-eminently suitable. The number of alkenic substituents per aromatic nucleus preferably amounts to from 1 to 3. They may be the same or different from each other.

Suitable hydrocarbon radicals Y are alkyl, aralkyl and cycloalkyl groups, and in particular branched hydrocarbon chains and cyclic radicals, attached to the aromatic nucleus by a tertiary or quaternary carbon atom such as tert-butyl, tert-amyl, diisobutyl, cyclohexyl, norbornyl and isobornyl groups. One of the radicals Y can, moreover, be an aryl or alkaryl radical, as for example, phenyl. The radical Y generally contains not more than 18, and preferably not more than 12 carbon atoms. Very favorable results are obtained when one or two hydrocarbon radicals Y are present per aromatic nucleus. This applies in particular to phenols and naphthols.

According to a very advantageous manner of carrying out the invention, phenolic compounds obtained by Claisen rearrangement of allyl ethers of hydroxy aromatic compounds, such as phenols, naphthols and the like, are used as starting material. Thus, by heating the allyl ether in question, a rearrangement takes place in which the allyl group, which may or may not be substituted, migrates to an ortho-position. If these positions are already occupied, then as a rule the corresponding para-substitution product is formed. The temperatures required for these rearrangements generally lie between 100° and 300° C., and in particular between 200° and 250° C. They are dependent, however, on the ether being used. If desired, the heating can be carried out at reduced pressure or in solution. The allyl ethers themselves are obtained in a known manner, as for example, by reaction of phenolic compounds with an allyl halide in a polar solvent, such as acetone, under the influence of potassium carbonate. According to another method, the corresponding alkali or alkaline-earth metal phenolate is first prepared, as for example, by reacting the phenol with sodium in a non-polar solvent, preferably in an aromatic hydrocarbon such as xylene; the product formed is subsequently made to react with an allyl halide, in particular, an allyl bromide. It is often not necessary first to separate the allyl ether formed and then to heat to the rearrangement temperature. Usually it is more advantageous to heat the crude mixture obtained as such to a temperature suited for rearrangement and next to isolate the product of the rearrangement. In certain cases it is recommended to allow the formation of the allyl ether to take place at superatmospheric pressure, because both the formation and the rearrangement of the ether can then be achieved in a single step. If the allyl group contains substituents it is often not immaterial which of the above-mentioned methods is used for the introduction of the allyl group in question into the phenolic compound. For the rearrangement may, for instance, take place according to different mechanisms, dependent on whether the heating is carried out in a polar or a non-polar medium, as a result of which the formation of isomeric products containing substituted alkyl groups is possible.

With a very attractive variant of the Claisen rearrangement, in which an aromatic hydroxy carboxylic acid, such as an alkylated salicylic acid, is used as the starting material, decarboxylation takes place and the carboxyl group is replaced by the allyl group. This reaction is used with advantage in the preparation of phenolic compounds which, in addition to an allyl substituent at an ortho-position, contain one or more hydrocarbon radicals Y, such as 4,6-dialkyl-2-allylphenols. For instance, salicylic acid is alkylated with an alkene, such as isobutene, and the alkylated product is subsequently converted into the methyl ester, from which the desired allyl ether is prepared. The latter, after preceding hydrolysis, is finally subjected to the Claisen rearrangement whereby decarboxylation takes place to form the corresponding ortho-allyl derivative. This manner of preparation is of particular interest, because during the alkylation of a phenol, invariably mixtures are formed which, among other compounds, contain considerable quantities of phenols alkylated at both ortho-positions. Hence, these positions are no longer available for the introduction of an allyl group.

Examples of substituted phenols which upon application of the process according to the invention give excellent results are, the following: orthoallylphenol, 4,6-dinorbornyl-2-allylphenol, 4-tert-butyl-2, 6-diallylphenol, 4-tert-butyl-2-allylphenol, 2,4,6-triallylphenol, 4,6-di-tert-butyl-2-allylphenol. Other likewise suitable phenolic compounds are the alkyl derivatives of 2-allyl-1-naphthol, 1-allyl-2-naphthol, 1,5-diallyl-2,6-dihydrovyanthracene, 1-allyl-2-hydroxyphenanthrene, 3-allyl-4-hydroxybiphenyl and 3-allyl-2-hydroxybiphenyl, the alkyl groups preferably representing one to three cyclohexyl, norbornyl and/or tert-butyl groups per molecule.

In the compound with the schematic formula Q—SH, which is made to react with the substituted phenol, Q stands for hydrogen or an organic radical. Dependent on the choice of this substituent Q, it is possible according to the process of the invention, to prepare sulfur-containing phenolic compounds which possess valuable anti-oxidant properties and which, e.g., are pre-eminently suited for application as additives to polymers of olefinically unsaturated compounds and other products sensitive to oxidation. Generally, the desired compounds are obtained direct as reaction products. In certain cases, however, it is desirable to subject the primarily formed product to a consecutive reaction, such as oxidation, for example, of a mercaptan to the disulphide, the reaction of a mercaptan with a second molecule of an unsaturated phenol to a thioether, or condensation reactions by means of functional groups, such as halogen or hydroxyl, e.g., with the aid of a metal sulphide or polysulphide.

The organic radical Q may, for example, represent an alkyl, an alkenyl or an aralkyl group; the latter may or may not be substituted in the nucleus. Preferably use is made of an alkyl group, which may or may not be branched, with at least 3 carbon atoms, for instance, an alkyl group in which a straight chain occurs of at least 8 and not more than 18 carbon atoms. Very good results are obtained with, e.g., n-dodecyl mercaptan. The organic radical Q, however, need not necessarily represent a hydrocarbon radical; it may also contain a chain, including hetero atoms, such as nitrogen, oxygen and, in particular, sulfur. The radical Q may also contain substituents, such as one or more halogen atoms, hydroxyl and/or sulfhydryl groups. In this connection especially those compounds are of importance in which such a substituent is attached to the last carbon atom of the chain, e.g., 4-chloro-1-butanethiol, 4-hydroxyl-1-butanethiol and, in particular, dithiols, in which the alkylene radical contains at least 2 and preferably not more than 6 carbon atoms, such as 1,4-butane-dithiol. In the last mentioned case a very active product is formed directly. In the other cases, however, it is often possible to increase the activity of the product by allowing the compound obtained primarily to react further, e.g., with sodium sulfide or a polysulfide if the substituent in question is a halogen atom.

Subsequent reactions are also of special importance when the compound Q—SH is hydrogen sulfide (Q=H). By application of the proper molecular ratios preferably the symmetrical thioether is allowed to form, the primarily formed mercaptan entering into reaction with a second molecule of the phenol. According to another advantageous process, the mercaptan is oxidized to a symmetrical disulfide, e.g., by means of copper sulfate.

The reaction component Q—SH may finally be chosen with advantage from compounds in which Q is equal to R'—CO—, R'—CO—, for $R'_2N$—CS—, where R' stands for hydrogen or preferably, however, for an alkyl radical. The compounds thus prepared are thioesters, dithioesters and dithiocarbamates, respectively.

Reactions of olefins with the sulfur-containing compounds in question of the type Q—SH are as a rule effected under the influence of peroxidic catalysts, such as tert-butyl hydroperoxide, dicumyl peroxide, benzoyl peroxide, etc. It was found, however, that the analogous reaction according to the invention with olefinic compounds which satisfy the above general definition either does not take place at all or gives only extremely small yields, when peroxidic catalysts are used. On the other hand, it has been found that very good results are obtained when this reaction is carried out under the influence of radicals which have been formed in a different way, for instance with the aid of high-energy radiation, such as ultra-violet light, X-rays or gamma-rays, or with non-peroxidic radical sources, such as metal alkyls and, particularly, azo compounds. The latter generally contain an azo group, which is attached to non-aromatic carbon atoms, of which at least one is a tertiary carbon atom, which is attached to a negative radical, such as a cyano group, a carbon amide or a carbalkoxy group, such as, for example, azo-bis-2-methyl propane nitrile, azo-bis-2-methyl butane nitrile, azo-bis-2-ethyl pentane nitrile, azo-bis-2-propyl hexane nitrile, azo-bis-2-methyl-3-phenyl propane nitrile and azo-bis-2-ethyl-3-phenyl propane nitrile. Other examples are especially the symmetrical azodinitriles, such as azo-bis (cyano alkanes) with at least 4 carbon atoms such as, for example, azo-bis-2-methyl butane nitrile and azo-bis-2-ethyl pentane nitrile, and in particular alpha-alpha'-azodiisobutyronitrile (azobisisobutyronitrile). Other suitable azobisnitriles are listed in Tables 10.10 and 10.11 of Free Radicals in Solution by Cheves Walling, John Wiley and Sons, Inc. (1957).

According to the process of the present invention, the reaction components are usually reacted in approximately molar ratios; however, an excess of 50% or more of any reactant may be employed if desired. The reactants are heated for several hours, and preferably from about 5 to about 20 hours, at temperatures from about 50° to 150° C., and preferably from 70° to 100° C., in the presence of a suitable catalyst, which is preferably an azo compound such as the azo-bis-cyano alkanes having at least 4 carbon atoms, and more preferably, azobisisobutyronitrile. The catalyst is usually employed from about 0.1 to 10%, and preferably from about 1 to 5% on a mole basis, calculated per double bond of the phenol. The reaction is also usually carried on under an inert atmosphere, e.g., under nitrogen.

The products obtained according to the process of the invention have not been described before. These compounds possess a phenolic group, in which one or more hydrogen atoms of the aromatic nucleus are substituted. At any rate, there must be present at least one substituent of the formula:

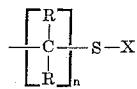

where X represents an organic radical, the substituents R stand for hydrogen atoms and/or alkyl radicals, preferably methyl, and $n$ is an integer equal to or greater than 2, and is preferably equal to 3 and, if desired, greater than 3. The phenolic nucleus preferably contains, in addition to the hydroxyl group, also one or more hydrocarbon substituents. In addition to, or instead of, the last-mentioned groups still other substituents, e.g., a second hydroxyl group and/or an alkoxy radical, may be attached to the aromatic nucleus. Compounds in which the said substituents are located at the ortho-position(s) and/or the para-position relative to the hydroxyl group(s) are particularly effective.

As is apparent from the afore-mentioned methods of preparation, X may be, e.g., an alkyl, an alkenyl or an aralkyl group which may or may not be substituted in the nucleus, an acyl, thioacyl or mono or dialkylthiocarbamyl group, or one of the groups

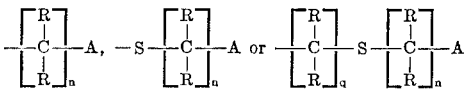

where A represents a phenolic group, $q$ stands for an an integer, as for example 2 to 6 inclusive, and where the symbols $n$ and R have the meanings described above and the R's may be either equal to or different from each other. The compounds in question preferably have a structure which can be represented by a symmetrical formula.

Generally the product is a derivative of phenol. Other phenolic compounds, however, are also suitable. The compounds in question in many cases contain hydrocarbon substituents which are attached to the aromatic nucleus. These are in particular branched alkyl and/or cycloalkyl radicals.

The novel sulfur-containing compounds of the present invention having the following structure are particularly preferred:

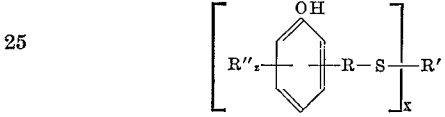

wherein R is an alkylene radical which may be straight or branched, R' is an alkyl or aralkyl, or alkylene radical, of, preferably, from 8 to 18 carbon atoms, R'' represents cycloaliphatic and/or branched aliphatic radicals, such as norbornyl, isobornyl, cyclohexyl, cyclopentyl and tertiary butyl radicals, $z$ is an integer of from 1 to 4 and $x$ is an integer of from 1 to 3, and preferably either 1 or 2. When $x=1$, R' is an alkyl radical and when $x=2$, R' is an alkylene radical. Also preferred are those compounds of the above structure wherein the substituents R'' and R are located at one or both ortho positions and/or para position relative to the hydroxyl group on the phenyl nuclei.

Examples of the new compounds are, for example, the ortho- and/or para-4-thiaalkylphenols, such as 2-(4-thiahexadecyl)-phenol, 2,6-bis(4-thiahexadedecyl)phenol, 2,4,6-tris(4-thiahexadecyl)-phenol and alkyl derivatives thereof, in particular norbornyl, isobornyl, cyclohexyl, cyclopentyl and tert-butyl derivatives, such as 4-tert-butyl - 2 - (4 - thiahexadecyl)phenol, 4 - tert - butyl - 2,6-bis(4 - thiahexadecyl)phenol, 4,6 - di - norbornyl - 2 - (4-thiahexadecyl)phenol and 1,12-bis(3,5-dinorbornyl-2-hydroxyphenyl)4,9-dithiadodecane.

Advantages of the invention are illustrated by the following examples. The reactants, and their proportions, and other specific ingredients of the recipes are presented as being typical and various modifications can be made in view of the foregoing disclosure and discussion, without departing from the spirit or scope of the disclosure or of the claims. Unless otherwise specified, parts and percentages disclosed in the examples are by weight.

*Example I*

This example illustrates the preparation of 4-tert-butyl-2-(4-thiahexadecyl)phenol by first preparing 4-tert-butylphenyl allyl ether by reacting p-tert-butylphenyl with allyl bromide; then converting the allyl ether so prepared to 4-tert-butyl-2-allylphenol; and finally reacting the 4-tert-butyl-2-allylphenol with n-dodecyl mercaptan to produce 4-tert-butyl-2-(4-thiahexadecyl)phenol.

(a) *4-tert-butylphenyl allyl ether.*—In a flask equipped with a reflux condenser a solution of 75 g. (0.5 mole) p-tert-butylphenol in 100 g. acetone, to which 60.5 g. (0.5 mole) allyl bromide and 70 g. (0.5 mole) potassium carbonate had been added, was heated at boiling temperature for 8 hours. The reaction mixture was then poured out into 0.5 liter water. Subsequently, two extractions were carried out with 100 ml. petroleum ether (boiling range: 60–80° C.), whereupon the combined petroleum ether extracts were washed with 100 ml. 4 N NaOH for the removal of unconverted p-tert-butylphenol. After removal of residual alkali and drying over sodium sulfate, the petroleum ether was evaporated and, finally, the residue distilled at reduced pressure. The yield of 4-tert-butylphenyl allyl ether was 71 g. (75% of the theory) with a boiling point of 121° C. at a pressure of 13 mm. Hg.

(b) *4-tert-butyl-2-allylphenol.*—68 g. of the 4-tert-butylphenyl allyl ether prepared under (a) was heated in an oil bath to 240° C. (bath temperature) for 1.5 hours. The temperature in the flask rose to 265° C. (exothermic reaction). After cooling, the product was taken up in 200 ml. petroleum ether (boiling range: 60–80° C.) and subsequently repeatedly extracted with 4 N caustic soda until acidification no longer caused turbidity. The combined caustic extracts were then acidified and subsequently extracted with petroleum ether. After drying of the petroleum ether solutions obtained, the solvent was evaporated and the residue distilled at reduced pressure. The yield of 4-tert-butyl-2-allylphenol was 49 g. (72% of the theory) with a boiling point of 132° C. at a pressure of 15 mm. Hg; $n_D^{20}$ 1.5245.

(c) *4-tert-butyl-2-(4-thiahexadecyl)phenol.*—A mixture of 9.5 g. (0.05 mole) of the 4-tert-butyl-2-allylphenol obtained under (b), 11.1 g. (0.055 mole) n-dodecyl mercaptan and 0.25 g. azodiisobutyronitrile (3% m. calculated on the phenol) was heated in a nitrogen atmosphere to about 85° C. for 16 hours. After cooling down the reaction product was washed three times with 50 ml. 80% methanol, diluted with 50 ml. ether, and subsequently washed with water to remove any residual methanol. Finally the ether solution was dried over sodium sulfate and heated to 160° C. for removal of the solvent and by-products, the heating being carried out first at atmospheric pressure and subsequently for three hours at a pressure of 0.05 mm. Hg. The product obtained as a residue was a pale yellow oil. The sulfur content was 8.6% (calculated: 8.2%); $n_D^{20}$ 1.5106.

*Example II.—2-(4-thiahexadecyl)phenol*

In a manner analogous to that described in Example I, phenyl allyl ether was prepared. The boiling point was 86° C. at a pressure of 20 mm. Hg; $n_D^{20}$ 1.5229. The o-allyl phenol obtained therefrom had a boiling point of 112° C. at a pressure of 20 mm. Hg; $n_D^{20}$ 1.5453. The reaction with n-dodecylmercaptan finally yielded the 2-(4-thiahexadecyl)phenol, which melted at 29–30° C. The sulfur content was 9.3% (calculated: 9.5%).

*Example III.—4-tert-butyl-2,6-bis(4-thiahexadecyl)phenol*

Starting from 4-tert-butyl-2-allylphenol the corresponding allyl ether was prepared in a manner analogous to that described in Example I under (a). This ether had a boiling point of 137° C. at a pressure of 16 mm. Hg; $n_D^{20}$ 1.5150. Heating of this ether to 240° C. according to (b) caused the formation of 4-tert-butyl-2,6-diallylphenol with a boiling point of 144° C. at a pressure of 11 mm. Hg. The yield was 62% of the theory.

The phenol obtained, when heated for 18 hours at 85° C. with twice the molar quantity of n-dodecylmercaptan and 3% m. azodiisobutyronitrile (calculated on the phenol) yielded a viscous oil. This was washed twice with twice the volume of anhydrous methanol. At 30–35° C. a rapid separation into phases occurred. The bottom layer was subsequently heated to 160° C. at atmospheric pressure and after that at a pressure of 0.05 mm. Hg, the desired product being left behind as residue. The yield was 50% of the theory (calculated on 4-tert-butyl-2,6-diallylphenol). The product had a sulfur content of 10.1% (calculated also 10.1%); $n_D^{20}$ 1.5079.

*Example IV.—2,6-bis(4-thiahexadecyl)phenol*

In a manner analogous to that described in Example III, o-allylphenyl allyl ether was prepared. This ether had a boiling point of 104–105° C. at a pressure of 10 mm. Hg. The 2,6-diallylphenol obtained from it had a boiling point of 121° C. at a pressure of 11 mm. Hg; $n_D^{20}$ 1.5400. The reaction with n-dodecyl mercaptan yielded the 2,6-bis(4-thiahexadecyl)phenol with a melting point of 41–42° C. The sulfur content was 10.7% (calculated: 11.1%).

*Example V.—Preparation of 4,6-dinorbornyl-2-(4-thiahexadecyl)phenol*

(a) *4,6-dinorbornyl-2-allylphenol.*—In a flask equipped with a reflux condenser 2.3 g. sodium was added to a solution of 28.2 g. 2,4-dinorbornylphenol in 200 ml. dry xylene. While stirring, the temperature was gradually raised until the sodium melted, which was accompanied by a strong evolution of hydrogen. After that the mixture was heated at boiling temperature until the sodium had disappeared. After cooling down to room temperature, 13.3 g. allyl bromide was added and the reaction mixture was gradually heated to boiling temperature, after which it was kept boiling for 6 hours. After cooling down to room temperature the mixture was filtered and the xylene subsequently distilled off at reduced pressure.

The residue obtained was then heated at 250° C. in a nitrogen atmosphere for two hours. Subsequently a distillation at reduced pressure was carried out, in which the main fraction was obtained as a pale yellow oil at about 160° C. and at a pressure of 0.03 mm. Hg. The yield of 4,6-dinorbornyl-2-allylphenol was 19 g.; $n_D^{20}$ 1.5615.

(b) *4,6-dinorbornyl-2-(4-thiahexadecyl)phenol.*—A mixture of 19 g. of the dinorbornylallylphenol obtained under (a), 12.73 g. n-dodecyl mercaptan and 0.15 g. azodiisobutyronitrile (1.5% m. calculated on the phenol) was heated in a nitrogen atmosphere at 85° C. for 16 hours. The reaction mixture was then washed four times with methanol, which led to a separation into phases. The pale yellow oil obtained, which formed the bottom layer was finally heated to 160° C. at a pressure of 0.05 mm. Hg for one hour for removal of contaminants. The residue was a yellow oil with a sulfur content of 6.05% (calculated 6.11%). The analysis yielded, moreover, the following figures: C=79.9%, H=10.8%, O=3.5%. Calculated: C=80.1%, H=10.7%, O=3.1%. The yield was 18 g.; $n_D^{20}$ 1.5258.

*Example VI.—1,12-bis(3,5-dinorbornyl-2-hydroxyphenyl)-4,9-dithiadodecane*

In a manner analogous to that described in the preceding examples, butane-1,4-dithiol was reacted with twice the molar quantity of the 4,6-dinorbornyl-2-allylphenol, prepared according to Example V under (a), by means of 3% m. azodiisobutyronitrile (calculated on the phenol). The product obtained after washing with absolute methanol, followed by heating to 160° C. at a pressure of 0.05 mm. Hg, was a pale yellow oil with a sulfur content of 9.1% (calculated: 8.4%).

*Example VII*

Example 1 is repeated except that 3% m. (calculated on the phenol) of azo-bis-2-ethyl butane nitrile is used instead of the azodiisobutyronitrile. Similar yields and products are obtained.

We claim as our invention:

1. A sulfur-containing phenolic compound of the formula:

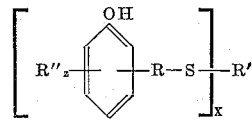

wherein R is an alkylene radical containing 3 carbon atoms, R″ is selected from the group consisting of norbornyl and tertiary butyl radicals, z is an integer of from 1 to 4, x is an integer having one of the values 1 and 2 and R′ is selected from the group consisting of alkyl and alkylene radicals containing from 8 to 18 carbon atoms.

2. A sulfur-containing phenolic compound of the formula:

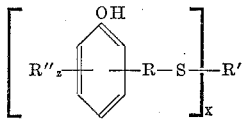

wherein R is an alkylene radical containing 3 carbon atoms, R″ represents norbornyl groups, z is an integer of from 1 to 4, x is an integer having one of the values 1 and 2 and R′ is selected from the group consisting of alkyl and alkylene radicals containing from 8 to 18 carbon atoms.

3. A sulfur-containing phenolic compound of the formula:

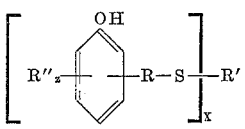

wherein R is an alkylene radical containing 3 carbon atoms, R″ represents tertiary butyl groups, z is an integer of from 1 to 4, x is an integer having one of the values 1 and 2 and R′ is selected from the group consisting of alkyl and alkylene radicals containing from 8 to 18 carbon atoms.

4. 2-(4-thiahexadecyl)phenol.

5. 4,6-dinorbornyl-2-(4-thiahexadecyl)phenol.

6. 1,12 - bis(3,5 - dinorbornyl-2-hydroxyphenyl)-4,9-dithia-dodecane.

7. A process for the preparation of sulfur-containing phenolic compounds which comprises reacting a compound Q—SH wherein Q is selected from the group consisting of hydrogen and alkyl radicals containing from 3 to 18 carbon atoms with a 4,6-dialkyl-2-allylphenol.

8. A process for the preparation of sulfur-containing phenolic compounds which comprises reacting a Q—SH compound wherein Q is selected from the group consisting of hydrogen and alkyl radicals containing from 3 to 18 carbon atoms with a 4-alkyl-2,6-diallylphenol.

9. A process for the preparation of sulfur-containing phenolic compounds which comprises reacting a Q—SH compound wherein Q is an omega-mercapto alkyl group with from 2 to 6 carbon atoms with a 4,6-dialkyl-2-allylphenol.

10. A process for the preparation of sulfur-containing phenolic compounds which comprises reacting a Q—SH compound wherein Q is an omega mercapto alkyl group with from 2 to 6 carbon atoms with a 4-alkyl-2,6-diallylphenol.

References Cited by the Examiner
UNITED STATES PATENTS

| | | | |
|---|---|---|---|
| 2,402,586 | 6/1946 | Alvarado | 260—609 |
| 2,831,030 | 4/1958 | Chenicek | 260—609 |
| 3,065,275 | 11/1962 | Goddard | 260—609 |

CHARLES B. PARKER, *Primary Examiner.*

DANIEL D. HORWITZ, *Examiner.*